(12) United States Patent
Soman et al.

(10) Patent No.: US 9,226,209 B2
(45) Date of Patent: Dec. 29, 2015

(54) POWER EFFICIENT NETWORK SEARCHING

(71) Applicant: QUALCOMM Incorporated, San Diego, CA (US)

(72) Inventors: Prashant Soman, San Diego, CA (US); Ashish Malik, San Diego, CA (US); Ankit Baphna, San Diego, CA (US); Gautham Mayyuri, San Diego, CA (US); Saritha Sivapuram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/304,424

(22) Filed: Jun. 13, 2014

(65) Prior Publication Data
US 2015/0181488 A1    Jun. 25, 2015

Related U.S. Application Data

(60) Provisional application No. 61/919,266, filed on Dec. 20, 2013.

(51) Int. Cl.
*H04W 4/00*    (2009.01)
*H04W 36/14*   (2009.01)
*H04W 24/08*   (2009.01)
(Continued)

(52) U.S. Cl.
CPC ............. *H04W 36/14* (2013.01); *H04W 24/08* (2013.01); *H04W 48/16* (2013.01); *H04W 52/02* (2013.01); *H04W 64/00* (2013.01); *H04W 48/18* (2013.01); *H04W 52/0209* (2013.01); *H04W 52/0241* (2013.01); *H04W 84/042* (2013.01)

(58) Field of Classification Search
CPC ..... H04W 48/20; H04W 48/18; H04W 48/16; H04W 48/12; H04W 8/26; H04W 8/12; H04W 8/06; H04W 24/08; H04W 52/02; H04W 52/0209; H04W 52/0241
USPC ............................ 455/435.1, 433, 434, 432.1
See application file for complete search history.

(56) References Cited

U.S. PATENT DOCUMENTS

| 7,920,869 | B2 | 4/2011 | Rager et al. |
| 8,437,288 | B2 * | 5/2013 | Edge ..................... H04W 48/16 370/328 |

(Continued)

FOREIGN PATENT DOCUMENTS

| EP | 1 460 872 A1 | 9/2004 |
| EP | 1 740 001 A1 | 1/2007 |

(Continued)

OTHER PUBLICATIONS

International Search Report and Written Opinion—PCT/US2014/069543—ISA/EPO—Mar. 27, 2015. (12 total pages).

*Primary Examiner* — Khai M Nguyen
(74) *Attorney, Agent, or Firm* — Arent Fox LLP

(57) ABSTRACT

Methods and apparatus for performing a search procedure include determining, by a processor, that a current location identifier of a current network is the same as a stored location identifier corresponding to a transition to or from a home network. The methods and apparatus further include initiating the search procedure based on determining that the current location identifier is the same as the stored location identifier.

20 Claims, 9 Drawing Sheets

(51) Int. Cl.
   *H04W 52/02* (2009.01)
   *H04W 64/00* (2009.01)
   *H04W 48/16* (2009.01)
   H04W 84/04 (2009.01)
   H04W 48/18 (2009.01)

(56) References Cited

U.S. PATENT DOCUMENTS

| | | | |
|---|---|---|---|
| 8,463,287 B2 * | 6/2013 | Kim | H04W 48/18 455/404.1 |
| 8,467,786 B2 | 6/2013 | Salkintzis | |

| | | | |
|---|---|---|---|
| 2010/0136969 A1 | 6/2010 | Nader et al. | |
| 2012/0044058 A1 * | 2/2012 | Shiotsu et al. | 340/10.5 |
| 2013/0210428 A1 | 8/2013 | Manna et al. | |
| 2014/0162640 A1 * | 6/2014 | Zhu | H04W 8/04 455/435.1 |

FOREIGN PATENT DOCUMENTS

| | | |
|---|---|---|
| GB | 2470194 A | 11/2010 |
| WO | WO-2008/087251 A1 | 7/2008 |
| WO | WO 2008087251 A1 * | 7/2008 |

* cited by examiner

POWER EFFICIENT NETWORK SEARCHING

CLAIM OF PRIORITY

The present Application for patent claims priority to Provisional Application No. 61/919,266 entitled "METHODS AND APPARATUS FOR POWER EFFICIENT NETWORK SEARCHING" filed Dec. 20, 2013, which is assigned to the assignee hereof and hereby expressly incorporated by reference herein.

BACKGROUND

Aspects of the present disclosure relate generally to wireless communication systems, and more particularly, to power efficient network searching by a user equipment in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In some wireless communication networks, overutilization of communication resources, particularly radio frequency and power resources for searching procedures may lead to degradations in wireless communication. Even more, the foregoing resource overutilization inhibits user equipments and/or wireless devices from achieving higher wireless communication quality, and may result in inefficient user equipment power consumption. Thus, improvements in user equipment network searching procedures are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of performing a search procedure includes determining, by a processor, that a current location identifier of a current network is the same as a stored location identifier corresponding to a transition to or from a home network. The method further includes initiating the search procedure based on determining that the current location identifier is the same as the stored location identifier.

In a further aspect, a computer-readable medium storing computer executable code includes code executable to determine that a current location identifier of a current network is the same as a stored location identifier corresponding to a transition to or from a home network. The computer-readable medium storing computer executable code further includes code executable to code executable to initiate a search procedure based on determining that the current location identifier is the same as the stored location identifier.

In an additional aspect, an apparatus for performing a search procedure includes means for determining that a current location identifier of a current network is the same as a stored location identifier corresponding to a transition to or from a home network. The apparatus further includes means for initiating the search procedure based on determining that the current location identifier is the same as the stored location identifier.

In another aspect, an apparatus for performing a search procedure includes a location information monitoring component configured to determine that a current location identifier of a current network is the same as a stored location identifier corresponding to a transition to or from a home network. The apparatus further includes a search procedure component configured to initiate the search procedure based on determining that the current location identifier is the same as the stored location identifier.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present aspects generally relate to power efficient wireless communication network searching procedures. Specifically, in some wireless communication networks, a UE may be in a roaming state when the UE obtains service from a network other than its home network. When in the roaming state, the UE may conduct frequent search procedures to relocate and establish communication with its home network. However, such frequent search procedures may consume high amounts of limited UE power supply. For example, the UE may lose much if not all of its power supply during an extended roaming state due to the excessive search procedures.

Accordingly, in some aspects, the present methods and apparatuses may provide an efficient solution, as compared to current solutions, to maintain a location history of the UE by storing location information in a database as the UE transitions or moves between a home network and a visited network, and to utilize current location information and the location history to determine whether or not to trigger a search procedure to establish communication with its home network. In other words, the present aspects allow UE to identify visited networks proximate and/or adjacent to the home network, and to identify whether or not a current network is one of the proximate and/or adjacent visited networks so that the UE can efficiently initiate a search for the home network when near the home network.

Figure 1:
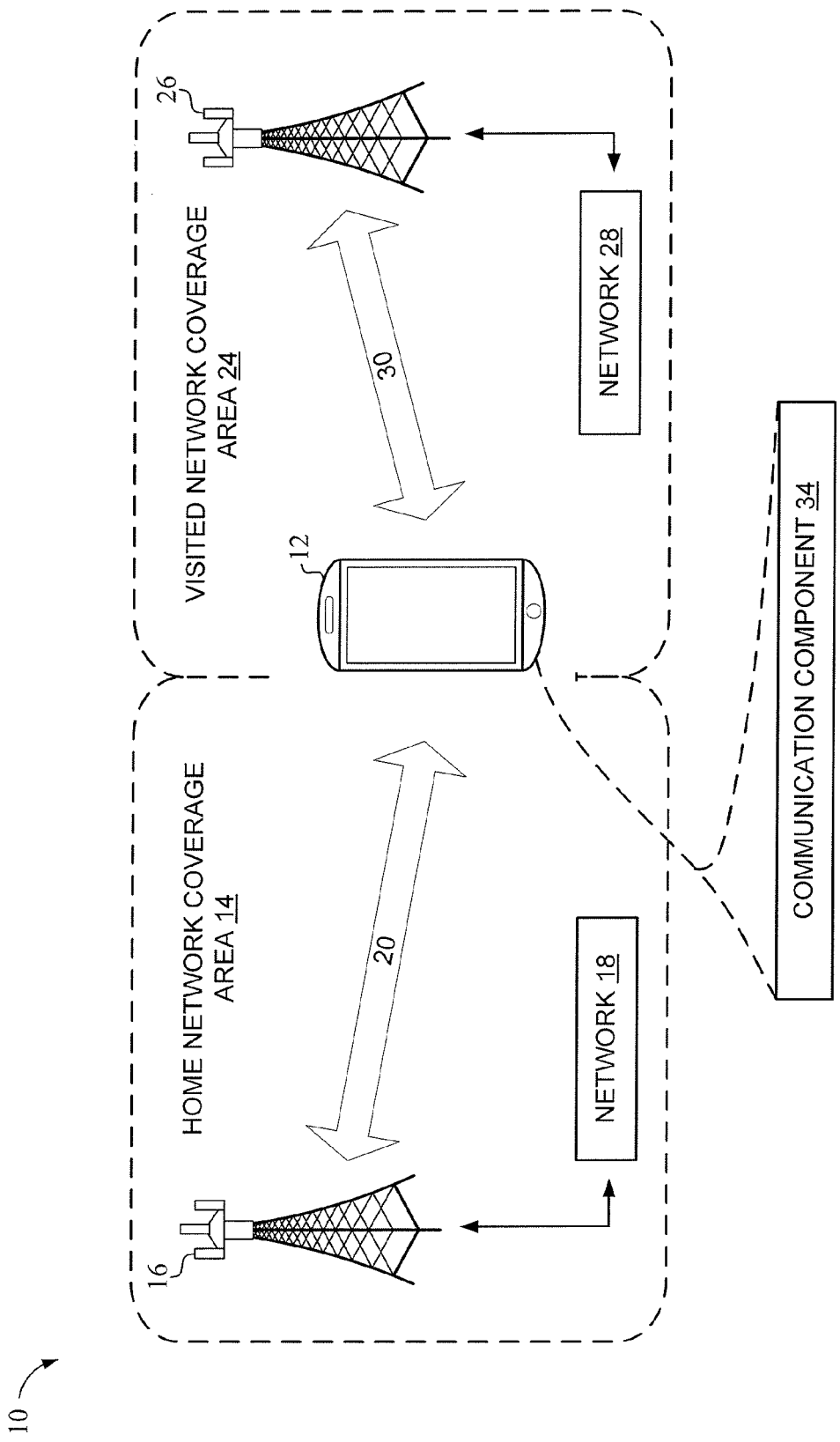
FIG. 1 is a schematic diagram of a communication network including an aspect of a user equipment that may perform one or more search procedures in accordance with a communication component.

Referring to FIG. 1, in an aspect, a wireless communication system 10 includes at least one UE 12 in communication coverage of at least first network entity 16 and second network entity 26. UE 12 may communicate with home network 18 associated with a home network coverage area 14 by way of, for instance, first network entity 16. Further, UE 12 may communicate with visited network 28, e.g., a network that is not a home network, associated with visited network coverage area 24 by way of, for example, second network entity 26. In some aspects, multiple UEs including UE 12 may be in communication coverage with one or more network entities, including first network entity 16 and second network entity 26. It should be understood that UE 12 may communicate with one or more cells included or deployed at one or both first network entity 16 and second network entity 26. Additionally, in some aspects, visited network coverage area 24 may alternatively be referred to as a roaming network coverage area corresponding to a roaming network, which may be the same as or similar to visited network 28.

UE 12 may communicate with home network 18 via one or more first communication channels 20 and utilizing one or more radio access technologies (RATs). Additionally, UE 12 may communicate with visited network 28 via one or more second communication channels 30 and utilizing one or more RATs. In such aspects, the one or more first communication channels 20 and/or one or more second communication channels 30 may enable communication on both the uplink and downlink between UE 12 and first network entity 16 and/or second network entity 26, respectively. In an example, UE 12 may transmit and/or receive wireless communication data to and/or from first network entity 16 and/or second network entity 26.

For example, the wireless communication data may include information such as, but not limited to, location information associated with and/or identifying a particular network on which UE 12 is registered. In one aspect, home network 18 may include or otherwise be referred to as a home public land mobile network (HPLMN). Additionally, in another aspect, visited network 28 may include or otherwise be referred to as a visited public land mobile network (VPLMN).

For example, an HPLMN may be a public land mobile network (PLMN) where the mobile country code (MCC) and the mobile network code (MNC) of the PLMN identity match the MCC and MNC of the international mobile subscriber identity (IMSI). In such aspects, a PLMN may be a network established and operated by an administration for the purposes of providing mobile communication services to the public.

Further, a PLMN may provide communication capabilities for a mobile user and/or UE 12. In other aspects, the MCC may uniquely identify the country of domicile of a mobile subscriber (e.g., UE 12). Additionally, the MNC may, in conjunction with the MCC, uniquely identify a mobile network operator/carrier (e.g., first network entity 16 and/or network 18). In further aspects, a VPLMN may be a PLMN on which the mobile subscriber (e.g., UE 12) has roamed when leaving the HPLMN.

According to the present aspects, UE 12 may include communication component 34, which may be configured to maintain a location history of the UE 12 by storing location information in a database as the UE 12 transitions or moves between home network coverage area 14 and visited network coverage area 24. Additionally, communication component 34 may be configured to utilize current location information and the location history to determine whether or not to trigger a search procedure to establish communication with its home network.

Further, communication component 34 may be configured to identify visited networks (e.g., visited network coverage area 24) proximate and/or adjacent to the home network (e.g., home network coverage area 14), and to identify whether or not a current network is one of the proximate and/or adjacent visited networks so that the UE can efficiently initiate a search for the home network when in proximity to the home network.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a device for Internet-of-Things, a wireless transmit/receive unit, or some other suitable terminology.

Additionally, first network entity 16 and second network entity 26 may be a macrocell, small cell, picocell, femtocell, access point, relay, Node B, mobile Node B, UE (e.g., communicating in peer-to-peer or ad-hoc mode with UE 12), or substantially any type of component that can communicate with UE 12 to provide wireless network access at the UE 12.

Figure 2:
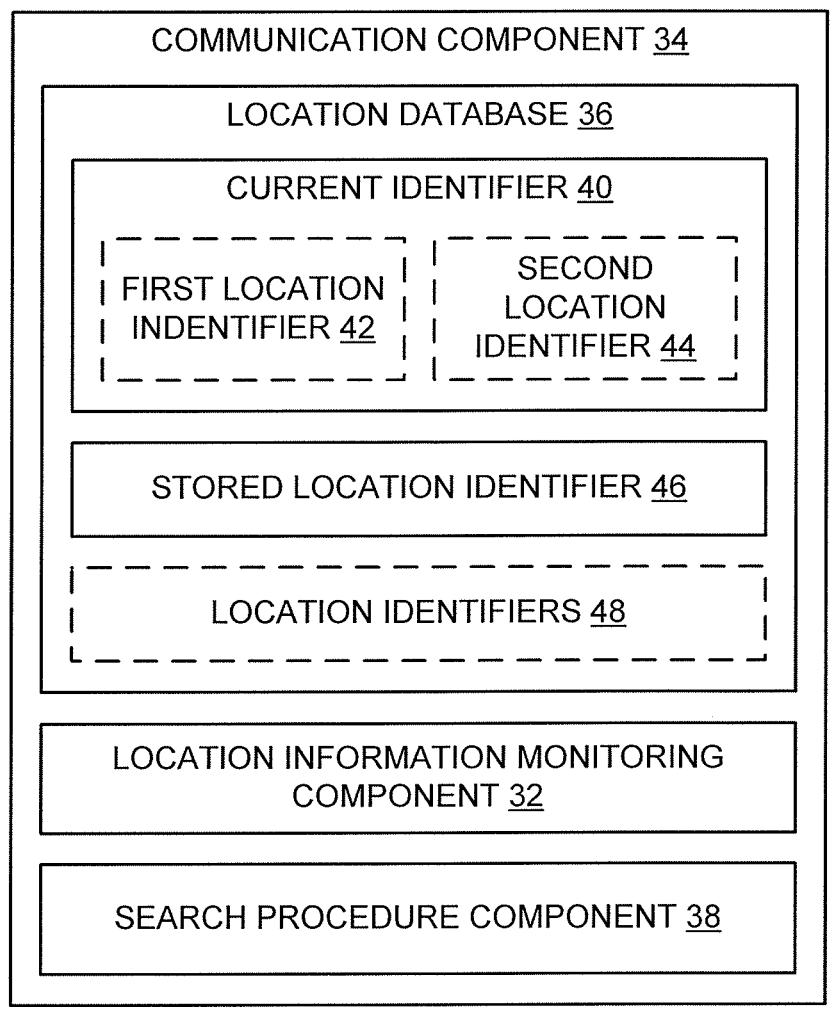
FIG. 2 is a schematic diagram of an aspect of the communication component in accordance with an aspect of the present disclosure, e.g., according to FIG. 1.

Referring to FIG. 2, in an aspect, channel selection component 190 may include various components and/or subcomponents, which may be configured to perform a search procedure to locate a home network 18 (FIG. 1) when UE 12 (FIG. 1) determines that a current visited network with which it is registered corresponds to a visited network known to correspond to a transition to or from home network 18 (FIG. 1). In an aspect, the term "component" as used herein may be one of the parts that make up or form a system, may be hardware or software, and may be divided into other components.

For example, communication component 34 may be configured to control or otherwise selectively trigger the use of power consuming radio resources for network searching purposes based on location information received from a network entity (e.g., second network entity 26, FIG. 1) associated with home network 18 (FIG. 1), e.g., a visited network, such as visited network 28 (FIG. 1), known to correspond to a transition to or from home network 18 (FIG. 1), or, in other words, known to be proximate and/or adjacent to or to be overlapping with home network 18 (FIG. 1).

Additionally, communication component 34 may include location information monitoring component 32, which may be configured to determine whether the current location identifier 40 is the same as a stored location identifier 46. In other words, location information monitoring component 32 may be configured to determine that a current location identifier 40 of a current network (e.g., visited network coverage area 24, FIG. 1) is the same as a stored location identifier 46 corresponding to a transition to or from a home network (e.g., home network coverage area 14, FIG. 1).

For example, location information monitoring component 32 may be configured to search location database 36 for current location identifier 40 upon receiving search location identifier. In such aspects, location information monitoring component 32 may be configured to continually compare received location identifiers identified or otherwise set as the current location identifier 40 with one or more stored location identifiers including the stored location identifier 46 to determine whether an overlap or match exists. In some aspects, for instance, location information including location identifiers may be stored in a file or in a retrievable location within the UE 12 or a subscriber identity module (SIM) card.

In additional aspects, communication component 34 may include search procedure component 38, which may be configured to initiate a search procedure based on communication component 34, or one or more subcomponents thereof, determining that the current location identifier 40 is the same as the stored location identifier 46. For example, search procedure component 38 may be configured to initiate a search procedure based on communication component 34, or one or more subcomponents thereof, determining that the current location identifier 40 is the same as the stored location identifier 46.

In some aspects, initiating the search procedure may include triggering activation of radio frequency resources. In other aspects, initiating the search procedure may includes setting or initiating a home network search timer in conjunction with the activation of the radio frequency resources. As such, UE 12 radio frequency resources may not be activated until a positive indication is provided to search procedure component 38 that UE 12 is within or will likely be within and/or in proximity of home network coverage area 14 (FIG. 1), and thereby reduce the overall power consumption associated with conducting frequency home network search procedures.

In an aspect, as the UE 12 moves from visited network coverage area 24 (FIG. 1) to home network coverage area 14 (FIG. 1), the UE 12 may, via communication component 34, register with the network providing coverage and/or service to UE 12. In other words, communication component 34 may be configured to register with a visited network having a location identifier when the UE 12 transitions from the home network to the visited network. Specifically, communication component 34 may be configured to receive a first location identifier 42, which may identify or otherwise be associated with a particular network with which UE 12 has established a connection (e.g., visited network) after moving out of home network.

For example, UE 12, via communication component 34, may be configured to register with a first visited network having a first location identifier 42 when the UE transitions from a home network to the first visited network (e.g., visited network coverage area 24, FIG. 1). Additionally, communication component 34 may be configured to store the first location identifier 42 when the first location identifier 42 is not stored in a database of location identifiers (e.g., location database 36) corresponding to the transition to or from the home network, wherein the location database 36 includes the stored location identifier.

Upon registering with the network providing coverage and/or service for the UE 12, the network may be identified as the current network. In such aspect, the first visited network (e.g., network 28, FIG. 1) may be identified as the current network. That is, upon entry into a network coverage area, the corresponding network may be referred to as the current network. Further, the first location identifier 42 may be identified as the current location identifier. Hence, the current location identifier may be the location identifier by which UE 12 may identify the network currently providing coverage and/or service to UE 12.

In an example, UE 12 including communication component 34 may be traveling and transition into visited network coverage area 24 (FIG. 1), and may thereby select to communicate with second network entity 26 (FIG. 1). As such, communication component 34 may be configured to receive the first location identifier 42 associated with visited network 28 (FIG. 1). In other words, the first location identifier 42 is associated with the home network 18 in the sense that it corresponds to a visited network that is proximate and/or adjacent to or overlapping with home network 18.

Additionally, in this aspect, communication component 34 may be configured to store the first location identifier 42 when such location information is not stored in location database 36. In other words, if first location identifier 42 is not already known to correspond to a visited network proximate and/or adjacent to the home network 18 (FIG. 1), then UE 12 may store first location identifier 42 for future use when roaming so as to identify the UE when UE is approaching home network 18 (FIG. 1) and can efficiently initiate a search.

In an alternative or additional aspect, when UE returns or otherwise transitions from visited network coverage area 24 (FIG. 1) to home network coverage area 14 (FIG. 1), communication component 34 may be configured to register with the visited network having a location identifier. In this aspect, visited network coverage area 24 (FIG. 1) may be considered and/or referred to a second visited network having a second location identifier 44. Upon registering with the second visited network, communication component 34 may be configured to identify the second visited network as the current network. As such, the second location identifier may be identified as the current location identifier. In some aspects, network 28 (FIG. 1) may be referred to as the first visited network and/or the second visited network.

Additionally, communication component 34 may be configured to identify the last stored visited network location information, e.g., a second location identifier 44 in this case, associated with the last network (e.g., second visited network) used before entering home network coverage area 14 (FIG. 1), e.g., the visited network 28 (FIG. 1) when the UE returns or otherwise transitions from the second visited network to the home network. In other words, the second location identifier 44 may be associated with the home network 18 (FIG. 1) in the sense that it corresponds to a visited network that is proximate and/or adjacent to or overlapping with home network 18 (FIG. 1). As such, communication component 34 may be configured to store the second location identifier 44 in location database 36 when the second location identifier is not already stored in location database 36.

As an example, as the UE 12 moves from visited network coverage area 24 (FIG. 1) to home network coverage area 14 (FIG. 1), location information monitoring component 32 may be configured to receive and compare the current location identifier 40 with the location identifier previously received and stored (e.g., stored location identifier 46) when UE 12 moved from home network coverage area 14 (FIG. 1) to visited network coverage area 24 (FIG. 1). In such aspect, the first location identifier 42 and the second location identifier 44 may both be associated with or identify the home network 18 or visited network 28. As such, location information monitoring component 32 may be configured to provide an indication to search procedure component 38 of a location identifier match to trigger a search procedure to locate home network.

Specifically, in one aspect of populating a database of location identifiers corresponding to the transition to or from the home network, e.g., location database 36, communication component 34 may be configured to monitor or otherwise continuously determine whether current location information exists or is stored within such a database. For example, in one aspect, communication component 34 may be configured to receive current location information, e.g., first location information in this case, when UE 12 transitions from home network coverage area 14 to visited network coverage area 24.

In other words, UE 12 and communication component 34 are configured to identify and store location information of visited networks associated with transitions to or from a home network. Further, communication component 34 may include, but is not limited to, one or more of a transmitter, a receiver, a transceiver, protocol stacks, transmit chain components, and receive chain components.

In an alternative or additional aspect relating to populating location database 36 with information of visited networks corresponding to home network 18, location database 36 may be loaded with a set of location identifiers 48 by a network operating entity that may be particular to the UE's 12 location. In other aspects, the current location identifier and the stored location identifier may include one or more of a location area indicator (LAI), global positioning system (GPS) information, and Wi-Fi information.

In additional aspects, network operating entities may obtain or otherwise be provided with the location information in the location database 36 for analytic purposes. For instance, network operating entities may obtain the historical movement or activity of UE 12 based at least on the location information (e.g., location identifiers) stored in location database 36. With such information, network operating entities may be able to form or generate location information for preloading onto UEs. That is, the set of location identifiers 48 may be determined based at least in part on the location information stored in location database 36.

Specifically, the set of location identifiers 48 may be determined or otherwise selected for loading onto a UE based on historical UE movements or pattern of movements between a home network and one or more visited networks, as identified by the location information. As a non-limiting example, historical location information obtained from location database 36 associated with a UE confined to, or otherwise located within a certain geographic area, may be used to form or generate location for preloading onto UEs deployed in a similar area.

Figure 3:
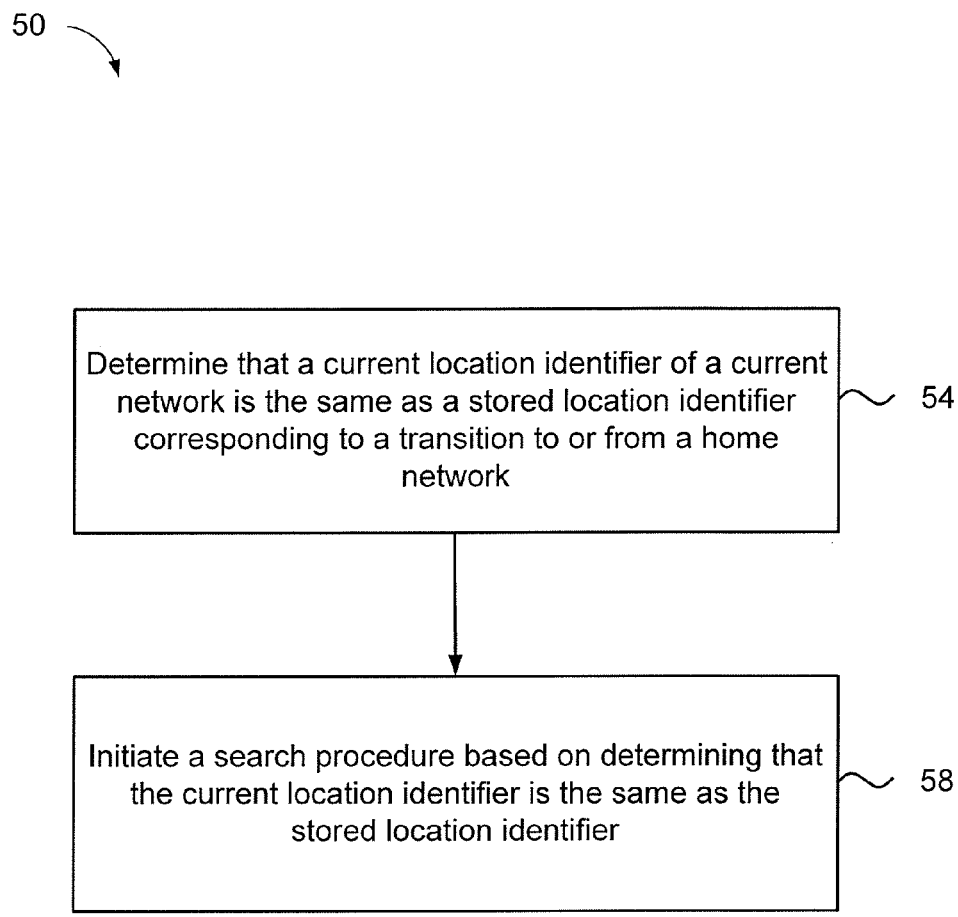
FIG. 3 is a flowchart of an aspect of a method of communication in accordance with an aspect of the present disclosure, e.g., according to FIG. 1.
Figure 4:
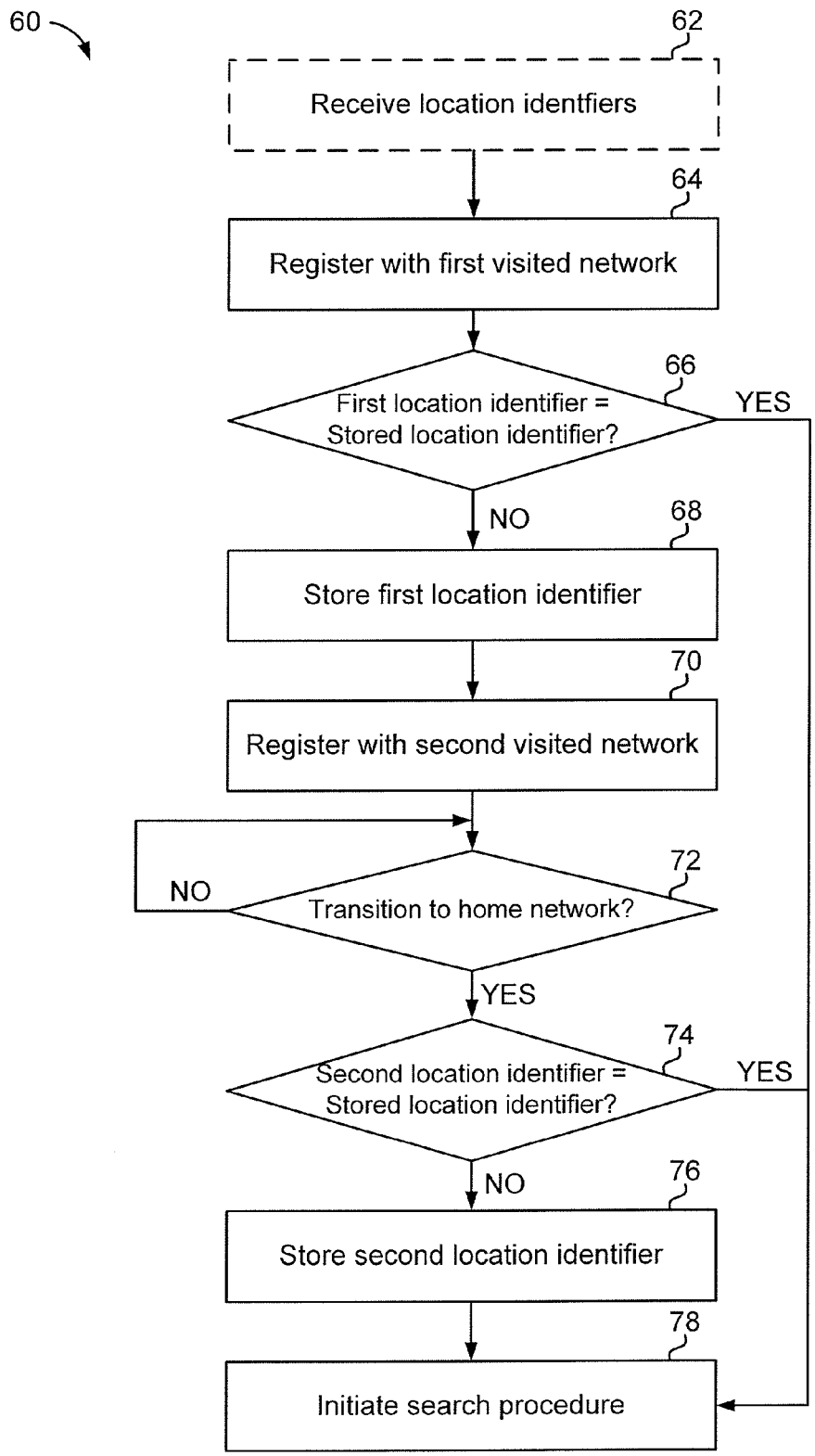
FIG. 4 is a flowchart of another aspect of a method of communication in accordance with an aspect of the present disclosure, e.g., according to FIG. 1.

Referring to FIGS. 3 and 4, the methods are shown and described as a series of acts for purposes of simplicity of explanation. However, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Referring to FIG. 3, in an operational aspect, a UE such as UE 12 (FIG. 1) may perform one aspect of a method 50 for performing a search procedure to locate a home network. In an aspect, at block 54, method 50 may determine that a current location identifier of a current network is the same as a stored location identifier corresponding to a transition to or from a home network. For example, as described herein, communication component 34 (FIG. 1) may execute location information monitoring component 32 (FIG. 1) to determine that a current location identifier 40 (FIG. 2) of a current network (e.g., visited network 28, FIG. 1) is the same as a stored location identifier 46 (FIG. 2) corresponding to a transition to or from a home network (e.g., home network 18, FIG. 1).

Further, at block 58, method 50 may initiate a search procedure based on determining that the current location identifier is the same as the stored location identifier. For example, as described herein, communication component 34 (FIG. 1) may execute search procedure component 38 (FIG. 1) to initiate a search procedure based on determining that the current location identifier 40 (FIG. 2) is the same as the stored location identifier 46 (FIG. 2).

Referring to FIG. 4, in an operational aspect, a UE such as UE 12 (FIG. 1) may perform one aspect of a method 60 for performing a search procedure to locate a home network. In an aspect, at block 62, method 60 may optionally include receiving location identifiers. For instance, as described herein, UE 12 (FIG. 1) may execute communication component 34 (FIGS. 1 and 2) to receive a set of location identifiers 48 (FIG. 2) associated with one or more visited networks in proximity to the home network. In some aspects, the UE 12 may have the location identifiers preloaded onto the UE 12 prior to operation. In other aspects, the home network (e.g., network 18, FIG. 1) may transmit the location identifiers to the UE 12 (FIG. 1) via an over-the-air interface (e.g., via first network entity 16 and one or more first communication channels 20, FIG. 1).

At block 64, method 60 may include registering with first visited network. For example, as described herein, UE 12 (FIG. 1) may execute communication component 34 (FIGS. 1 and 2) to register with the first visited network (e.g., network 28, FIG. 1) having a first location identifier 42 (FIG. 2) when the UE 12 (FIG. 1) transitions from the home network (e.g., network 18, FIG. 1) to the first visited network (e.g., network 28, FIG. 1).

Further, at block 66, method 60 may include determining whether the first location identifier is the same as a stored location identifier. For example, as described herein, UE 12 (FIG. 1) may execute communication component 34 (FIGS. 1 and 2) to determine whether the first location identifier 42 (FIG. 2) is the same as a stored location identifier 46 (FIG. 2) stored in location database 36 (FIG. 2). Method 60 may proceed to block 78 and initiate a search procedure when the first location identifier is the same as the stored location identifier. For example, as described herein, communication component 34 (FIGS. 1 and 2) may execute search procedure component 38 (FIG. 2) to initiate a search procedure when, for instance, the first location identifier 42 (FIG. 2) is the same as the stored location identifier 46 (FIG. 2).

Otherwise, method 60 may proceed to block 68 and may include storing the first location identifier. For instance, as described herein, communication component 34 (FIGS. 1 and 2) may execute location database 36 (FIG. 2) to store the first location identifier 42 (FIG. 2) when, for example, the first location identifier 42 (FIG. 2) is not the same as the stored location identifier 46 (FIG. 2). In some aspects, method 60 may, at block 68, store the first location identifier corresponding to a transition from the home network when not already stored in the location database.

Further, at block 70, method 60 may include registering with a second visited network. For instance, UE 12 (FIG. 1) may execute communication component 34 (FIGS. 1 and 2) to register with the second visited network (e.g., network 28, FIG. 1) having a second location identifier 44 (FIG. 2). In some aspects, the first location identifier 42 (FIG. 2) associated with the first visited network and the second location identifier 44 (FIG. 2) associated with the second visited network may be the same.

At block 72, method 60 may include determining whether the UE transitioned to the home network. For example, as described herein, communication component 34 (FIGS. 1 and 2) may execute location information monitoring component 32 (FIG. 2) to determine whether the UE 12 (FIG. 1) transitioned to the home network (e.g., network 18, FIG. 1) from the second visited network (e.g., network 28, FIG. 1). Method 60 may, at block 72, include continuously monitoring, via location information monitoring component 32 (FIG. 2) for a change or transition to the home network when a transition is not detected or otherwise determined at block 72.

Otherwise, method 60 may proceed to block 74 and may include determining whether the second location identifier is the same as the stored location identifier. For example, as described herein, UE 12 (FIG. 1) may execute communication component 34 (FIGS. 1 and 2) to determine whether the second location identifier 44 is the same as the stored location identifier 46 (FIG. 2) when, for example, the UE 12 (FIG. 1) transitions to the home network.

Additionally, in some aspects, at block 74, method 60 may include determining whether the second location identifier 44 (FIG. 2) is stored in the location database 36 (FIG. 2). In aspects where the first location identifier 42 (FIG. 2) and the second location identifier 44 (FIG. 2) are associated with the same visited network (e.g., network 28, FIG. 1), method 60 may include determining, at block 74, whether the second location identifier 44 (FIG. 2) referred to as the current location identifier is the same as the first location identifier 42 (FIG. 2) referred to as the stored location identifier 48 (FIG. 2).

Further, method 60 may proceed to block 76 and may include storing the second location identifier. For instance, as described herein, communication component 34 (FIGS. 1 and 2) may execute location database 36 (FIG. 2) to store the second location identifier 44 (FIG. 2) when, for example, the second location identifier 44 (FIG. 2) is not the same as the stored location identifier 46 (FIG. 2). Additionally, in some aspects, method 60 may include, at block 76, storing the second location identifier corresponding to a transition to the home network when not already stored in the location database.

Otherwise, method 60 may proceed to block 78 and may include initiating a search procedure when the second location identifier is the same as the stored location identifier. For example, as described herein, communication component 34 (FIGS. 1 and 2) may execute search procedure component 38 (FIG. 2) to initiate a search procedure when, for instance, the second location identifier 44 (FIG. 2) is the same as the stored location identifier 46 (FIG. 2).

Figure 5:
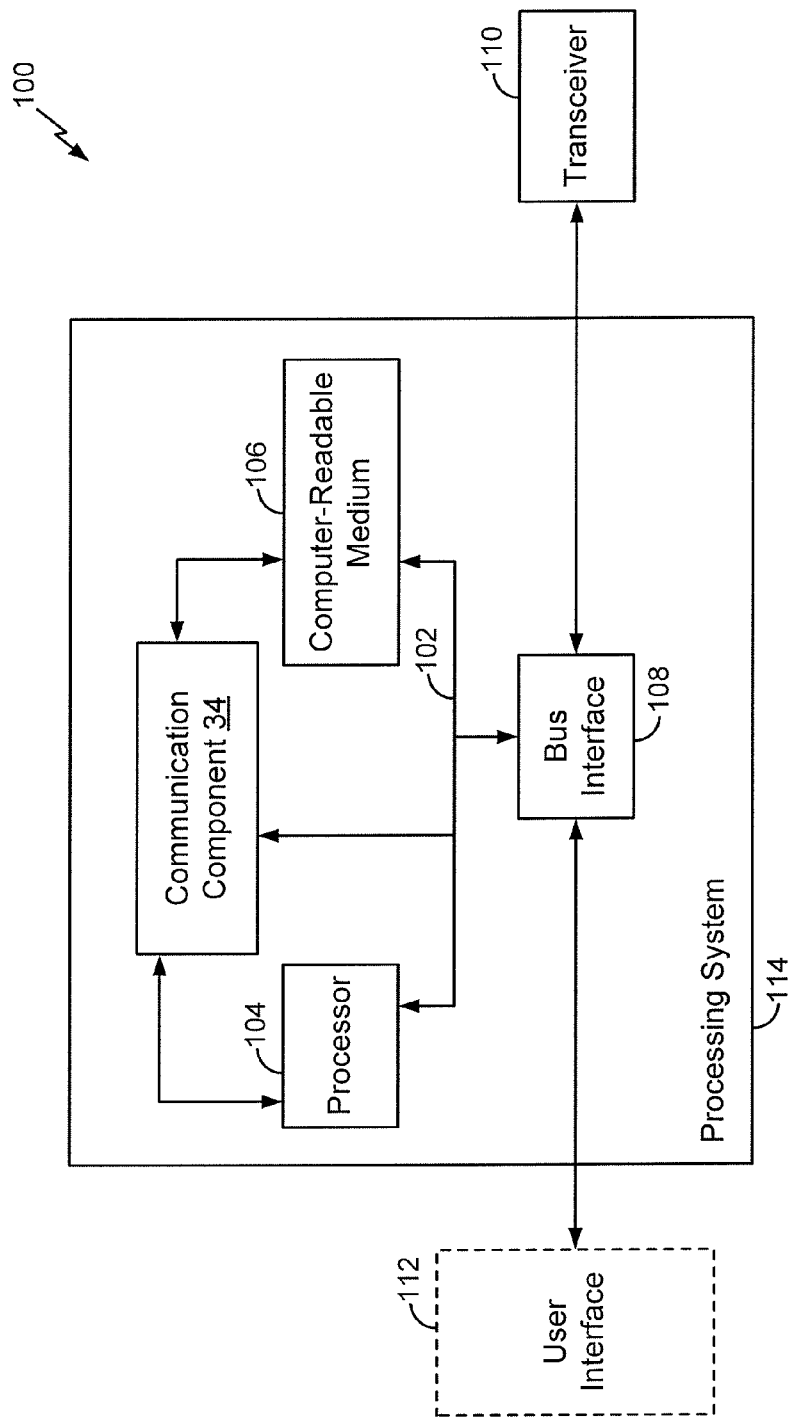
FIG. 5 is a block diagram illustrating an example of a hardware implementation for an apparatus employing a processing system in accordance with an aspect of the present disclosure, e.g., according to FIG. 1.

FIG. 5 is a block diagram illustrating an example of a hardware implementation for an apparatus 100 employing a processing system 114, wherein the apparatus may be the same as or similar to UE 12 executing at least communication component 34 (FIGS. 1 and 2). In this example communication component 34 (FIGS. 1 and 2) 34 may be programmed into processor 104 as one or more processor modules, or stored as instructions in computer-readable medium 106 that can be executed by processor 104, or some combination thereof. Further, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106, and UE components (e.g., UE 12), such as communication component 34.

The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Further, communication component 34 (FIG. 1) may be implemented by any one or more of processor 104 and computer-readable medium 106. For example, the processor and/or computer-readable medium 106 may be configured to, via system communication component 34 (FIG. 1), to perform one or more search procedures to locate a home network when a first location identifier is the same as a second location identifier.

Figure 6:
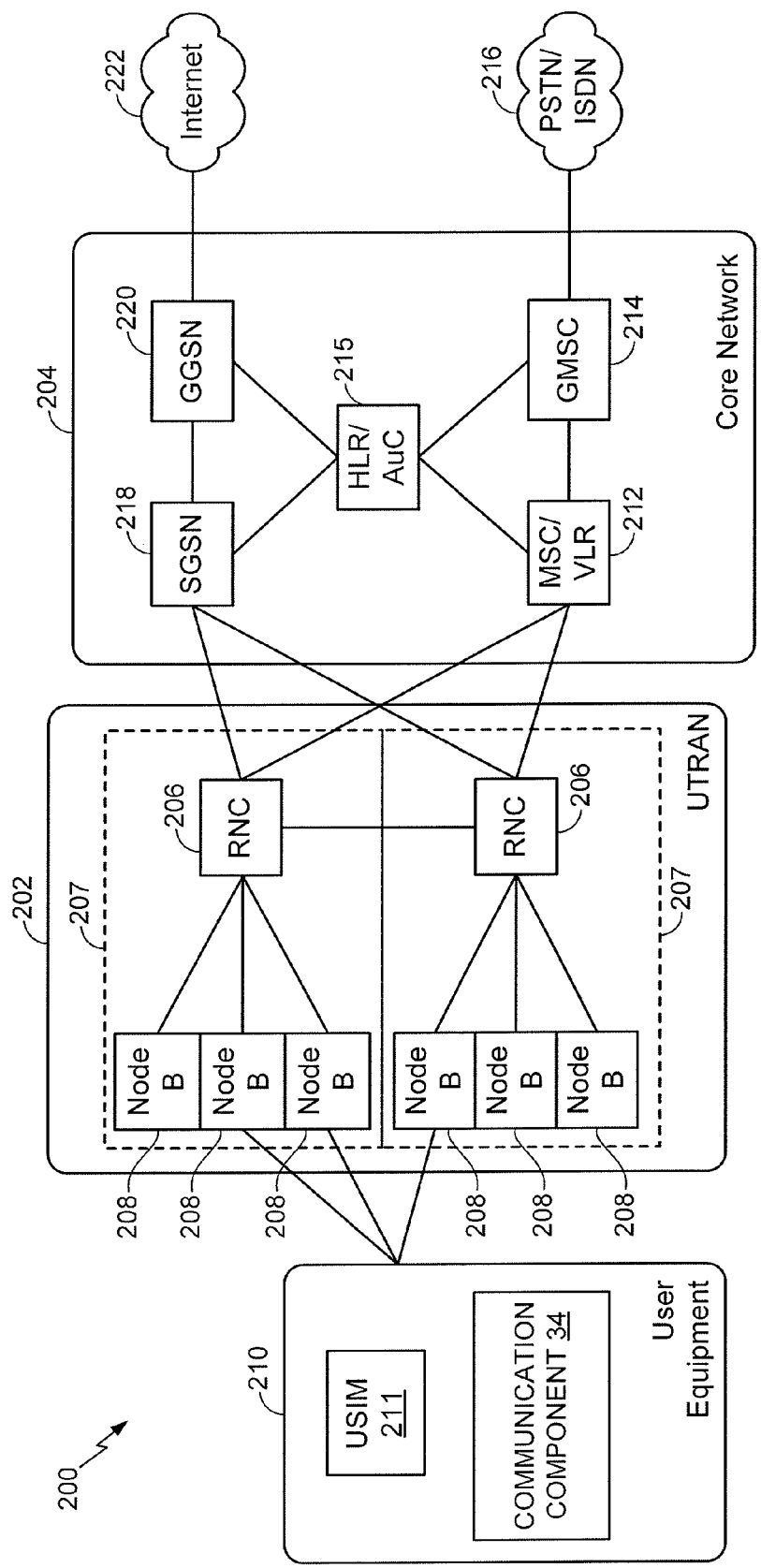
FIG. 6 is a block diagram conceptually illustrating an example of a telecommunications system in accordance with an aspect of the present disclosure, e.g., according to FIG. 1.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210 that may be the same as or similar to UE 12 including system communication component 34 (FIG. 1).

In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses.

Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visited location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214.

In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
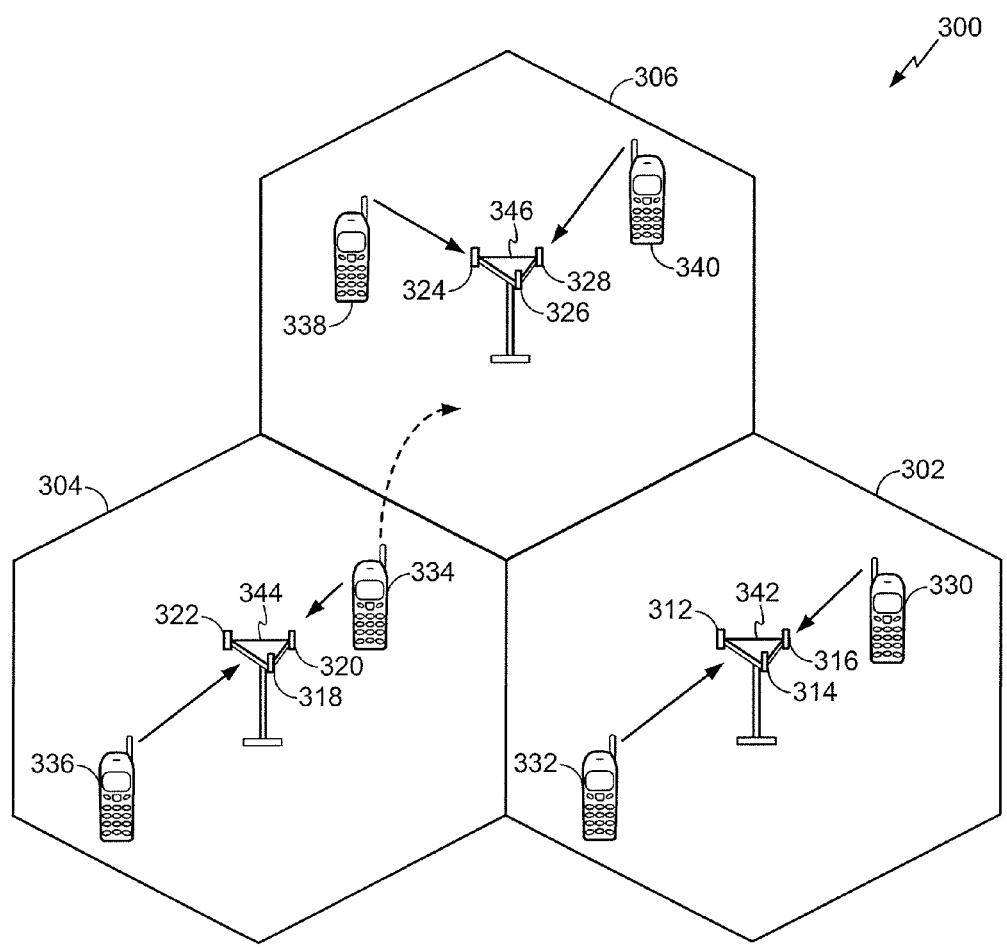
FIG. 7 is a conceptual diagram illustrating an example of an access network in accordance with an aspect of the present disclosure, e.g., according to FIG. 1.

Referring to FIG. 7, an access network 300 in a UTRAN architecture is illustrated in which a UE, such as a UE the same as or similar to UE 12 (FIG. 1) including communication component 34 may operate. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector.

The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 5) for all the UEs 330, 332, 334, 336, 338, 340 in the respective cells 302, 304, and 306. In an aspect, the UEs 330, 332, 334, 336, 338 and/or 340 may include communication component 34 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 6.

Figure 8:
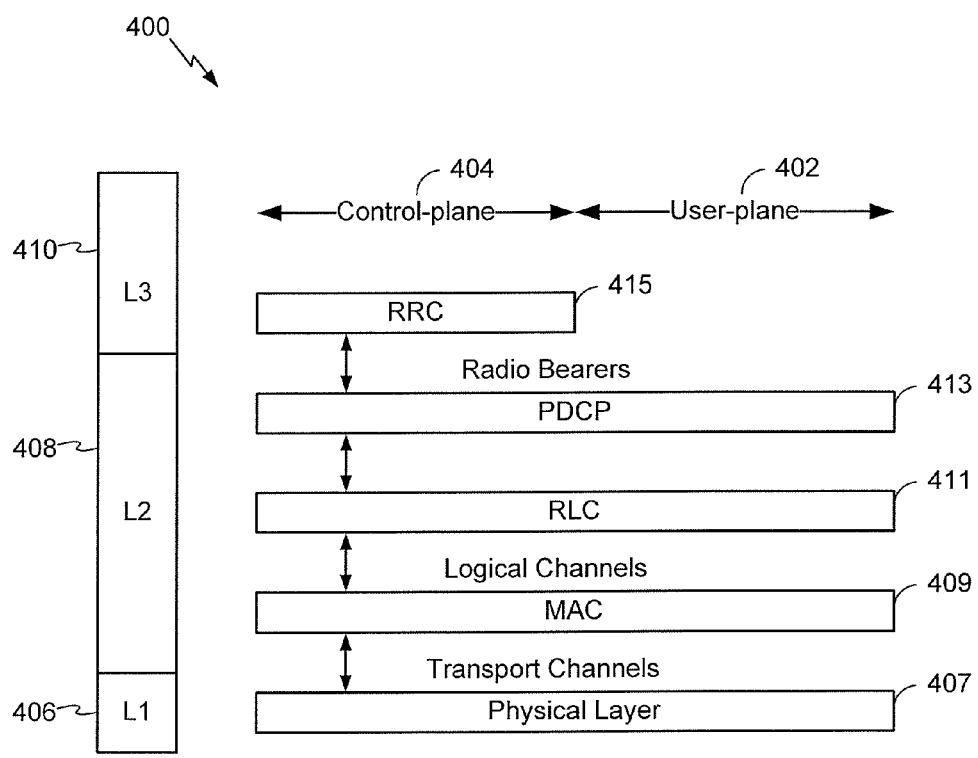
FIG. 8 is a conceptual diagram illustrating an example of a radio protocol architecture for the user and control plane in accordance with an aspect of the present disclosure, e.g., according to FIG. 1.

Referring to FIG. 8, an example radio protocol architecture 400 relates to the user plane 402 and the control plane 404 of a user equipment (UE) or node B/base station. For example, architecture 400 may be included in a UE such as UE 12 including communication component 34 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
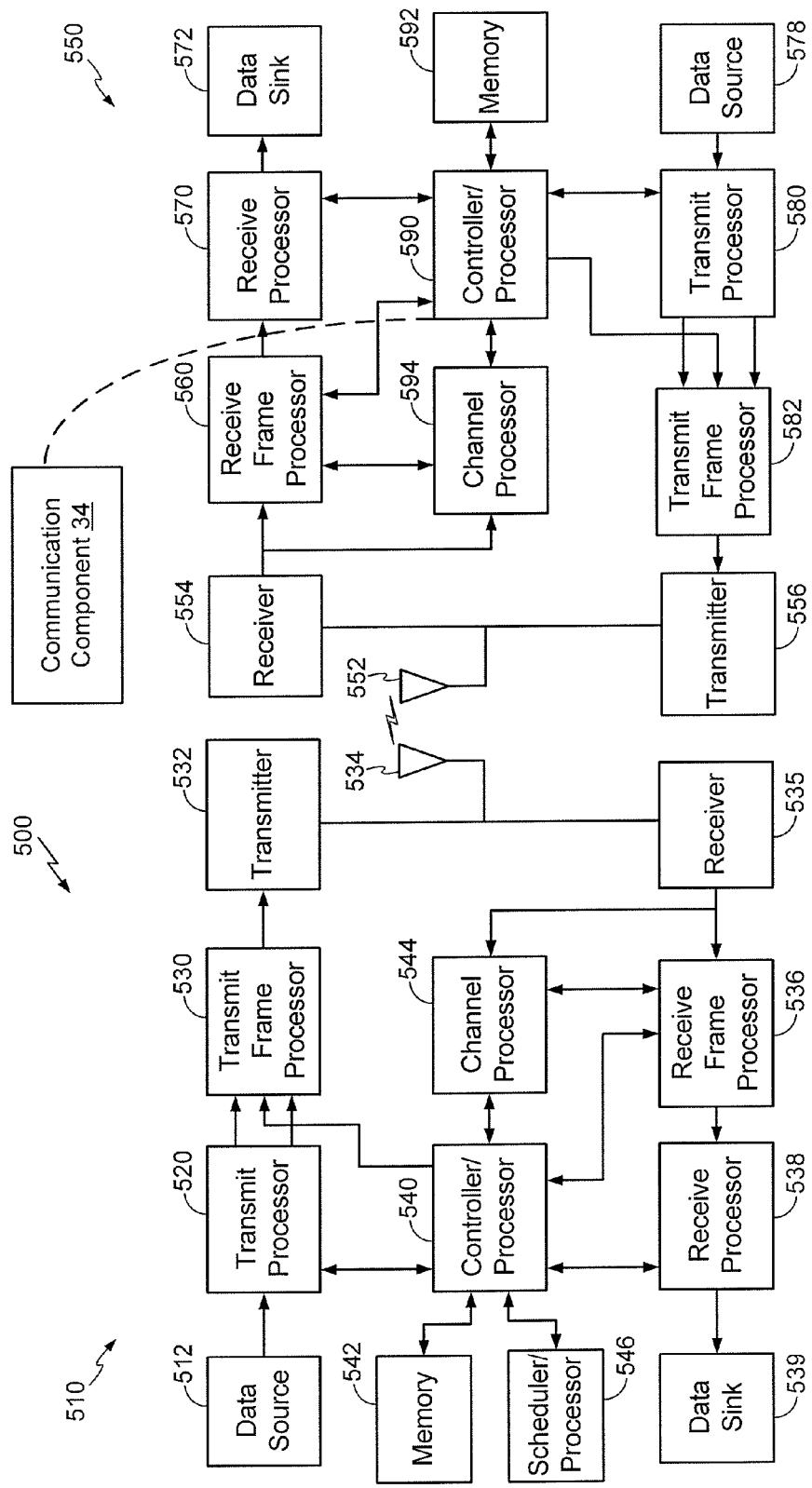
FIG. 9 is a block diagram conceptually illustrating an example of a Node B in communication with a user equipment in a telecommunications system and in accordance with an aspect of the present disclosure, e.g., according to FIG. 1.

FIG. 9 is a block diagram of a Node B 510 in communication with a UE 550, where the Node B 510 may be the Node B 208 in FIG. 6, and the UE 550 may be the UE 210 in FIG. 6 or the UE 12 including communication component 34 in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols.

Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of performing a search procedure, comprising:
   registering with a first visited network having a first location identifier when a user equipment (UE) transitions from a home network to a first visited network;
   storing the first location identifier when the first location identifier is not stored in a database of location identifiers corresponding to a transition to or from the home network, wherein the database includes a stored location identifier;
   determining, by a processor, that a current location identifier of a current network is the same as Hall the stored location identifier of a visited network that is identified as a network that corresponds to the transition to or from the home network; and
   initiating the search procedure based on determining that the current location identifier is the same as the stored location identifier.

2. The method of claim 1, wherein the first visited network is identified as the current network.

3. The method of claim 1, further comprising:
   registering with a second visited network having a second location identifier; and
   storing the second location identifier, when the UE transitions to the home network, and when the second location identifier is not stored in a database of location identifiers corresponding to the transition to or from the home network.

4. The method of claim 3, wherein the second visited network is identified as the current network.

5. The method of claim 1, wherein the home network comprises a home publication land mobile network.

6. The method of claim 1, wherein the current network comprises a visited publication land mobile network.

7. The method of claim 1, further comprising:
   receiving a set of location identifiers corresponding to visited networks proximate to the home network; and
   storing the set of location identifiers in a database of location identifiers corresponding to the transition to or from the home network.

8. The method of claim 1, wherein initiating the search procedure comprises triggering activation of radio frequency resources.

9. The method of claim 1, wherein the current location identifier and the stored location identifier comprise one or more of a location area indicator, global positioning information, and Wi-Fi information.

10. A non-transitory computer-readable medium storing computer executable code, comprising:
    code executable to register with a first visited network having a first location identifier when a user equipment (UE) transitions from a home network to a first visited network;
    code executable to store the first location identifier when the first location identifier is not stored in a database of location identifiers corresponding to a transition to or from the home network, wherein the database includes a stored location identifier;
    code executable to determine that a current location identifier of a current network is the same as the stored location identifier of a visited network that is identified as a network that corresponds to the transition to or from the home network; and
    code executable to initiate a search procedure based on determining that the current location identifier is the same as the stored location identifier.

11. An apparatus for performing a search procedure, comprising:
    means for registering with a first visited network having a first location identifier when the UE transitions from a home network to a first visited network;
    means for storing the first location identifier when the first location identifier is not stored in a database of location identifiers corresponding to a transition to or from the home network, wherein the database includes a stored location identifier;
    means for determining that a current location identifier of a current network is the same as the stored location identifier of a visited network that is identified as a network that corresponds to the transition to or from the home network; and
    means for initiating the search procedure based on determining that the current location identifier is the same as the stored location identifier.

12. An apparatus for performing a search procedure, comprising:
    a communication component configured to register with a first visited network having a first location identifier when a user equipment (UE) transitions from a home network to the first visited network;
    wherein the communication component is further configured to store the first location identifier when the first location identifier is not stored in a database of location identifiers corresponding to the transition to or from the home network, wherein the database includes a stored location identifier
    a location information monitoring component, comprising hardware, configured to determine that a current location identifier of a current network is the same as the stored location identifier of a visited network that is identified as a network that corresponds to the transition to or from the home network; and
    a search procedure component, comprising hardware, configured to initiate the search procedure based on determining that the current location identifier is the same as the stored location identifier.

13. The apparatus of claim 12, wherein the first visited network is identified as the current network.

14. The apparatus of claim 12, further comprising:
    the communication component configured to registering with a second visited network having a second location identifier; and
    wherein the communication component is further configured to store the second location identifier, when the UE transitions to the home network, and when the second location identifier is not stored in a database of location identifiers corresponding to the transition to or from the home network.

15. The apparatus of claim 14, wherein the second visited network is identified as the current network.

16. The apparatus of claim 12, wherein the home network comprises a home publication land mobile network.

17. The apparatus of claim 12, wherein the current network comprises a visited publication land mobile network.

18. The apparatus of claim 12, further comprising:
the communication component configured to receive a set of location identifiers corresponding to visited networks proximate to the home network; and
wherein the communication component is further configured to store the set of location identifiers in a database of location identifiers corresponding to the transition to or from the home network.

19. The apparatus of claim 12, wherein to initiate the search procedure, the search procedure component is further configured to trigger activation of radio frequency resources.

20. The apparatus of claim 12, wherein the current location identifier and the stored location identifier comprise one or more of a location area indicator, global positioning information, and Wi-Fi information.

* * * * *